United States Patent
Matsuoka

(10) Patent No.: US 8,126,519 B2
(45) Date of Patent: Feb. 28, 2012

(54) HOUSING FOR MOBILE COMPUTING DEVICE HAVING CONSTRUCTION TO SLIDE AND PIVOT INTO MULTIPLE POSITIONS

(75) Inventor: Yoshimichi Matsuoka, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1215 days.

(21) Appl. No.: 11/849,175

(22) Filed: Aug. 31, 2007

(65) Prior Publication Data

US 2009/0061956 A1    Mar. 5, 2009

(51) Int. Cl.
*H04M 1/00* (2006.01)

(52) U.S. Cl. .................. 455/575.3; 455/575.4

(58) Field of Classification Search ............... 455/575.4, 455/575.1, 575.3, 566, 550.1; 361/681; D14/138 AB, 138 AC, 181, 257
See application file for complete search history.

(56) References Cited

U.S. PATENT DOCUMENTS

| | | |
|---|---|---|
| 4,279,021 A | 7/1981 | See et al. |
| 4,415,065 A | 11/1983 | Sandstedt |
| 4,587,630 A | 5/1986 | Straton et al. |
| 4,725,694 A | 2/1988 | Auer et al. |
| 4,764,770 A | 8/1988 | Church |
| 4,887,212 A | 12/1989 | Zamora et al. |
| 4,892,981 A | 1/1990 | Soloway et al. |
| 4,916,441 A | 4/1990 | Gombrich |
| 5,010,547 A | 4/1991 | Johnson et al. |
| 5,012,219 A | 4/1991 | Henry |
| D320,598 S | 10/1991 | Auerbach et al. |
| 5,067,164 A | 11/1991 | Denker et al. |
| 5,075,684 A | 12/1991 | DeLuca |
| 5,101,439 A | 3/1992 | Kiang |
| 5,109,539 A | 4/1992 | Inubushi et al. |
| D326,451 S | 5/1992 | Roegner |
| 5,218,188 A | 6/1993 | Hanson |
| 5,227,614 A | 7/1993 | Danielson et al. |
| 5,235,561 A | 8/1993 | Seager |
| 5,307,086 A | 4/1994 | Griffin et al. |
| 5,334,824 A | 8/1994 | Martinez |
| 5,335,276 A | 8/1994 | Thompson et al. |
| 5,336,001 A | 8/1994 | Lichtenberg |
| 5,345,615 A | 9/1994 | Garofalo |

(Continued)

FOREIGN PATENT DOCUMENTS

EP    0149762    *    7/1986

(Continued)

OTHER PUBLICATIONS

"3GPP2 Multimedia Messaging System—MMS Specification Overview—Revision: A. Mobile Messaging", May 2003, [online] [Retrieved on Dec. 10, 2004] Retrieved from the internet: URL: http://www.lebodic.net/left.htm.*

(Continued)

*Primary Examiner* — Dwayne Bost
*Assistant Examiner* — Inder Mehra

(57) ABSTRACT

A housing for a computing device is provided that includes a base segment and a frontal segment. The base segment and the frontal segment may be coupled to enable the frontal segment to slide between an extended and contracted position. Additionally, the base segment and the frontal segment may be pivotally engaged to enable the frontal segment to pivot 180 degrees (or thereabouts) when in the extended position, and then to slide from the pivoted position into the contracted position.

18 Claims, 5 Drawing Sheets

U.S. PATENT DOCUMENTS

| | | | |
|---|---|---|---|
| 5,357,065 A | 10/1994 | Mitamura et al. | |
| 5,359,317 A | 10/1994 | Gomez et al. | |
| 5,379,057 A | 1/1995 | Clough et al. | |
| 5,381,387 A | 1/1995 | Blonder et al. | |
| 5,392,447 A | 2/1995 | Schlack et al. | |
| 5,394,140 A | 2/1995 | Wong et al. | |
| D359,920 S | 7/1995 | Sakamoto | |
| 5,440,629 A | 8/1995 | Gray | |
| 5,442,406 A | 8/1995 | Altmanshofer et al. | |
| 5,465,401 A | 11/1995 | Thompson | |
| 5,494,363 A | 2/1996 | Hochgesang | |
| 5,503,484 A | 4/1996 | Louis | |
| 5,510,808 A | 4/1996 | Cina | |
| 5,584,054 A | 12/1996 | Tyneski et al. | |
| 5,612,682 A | 3/1997 | DeLuca et al. | |
| 5,619,555 A | 4/1997 | Fenton et al. | |
| 5,627,978 A | 5/1997 | Altom et al. | |
| 5,650,776 A | 7/1997 | Mitchell et al. | |
| 5,661,641 A * | 8/1997 | Shindo | 361/814 |
| 5,705,995 A | 1/1998 | Laflin et al. | |
| 5,719,936 A | 2/1998 | Hillenmayer | |
| 5,742,894 A | 4/1998 | Jambhekar et al. | |
| 5,745,904 A | 4/1998 | King et al. | |
| 5,754,636 A | 5/1998 | Bayless et al. | |
| 5,779,030 A | 7/1998 | Ikegami et al. | |
| 5,797,089 A | 8/1998 | Nguyen | |
| 5,797,098 A | 8/1998 | Schroeder et al. | |
| 5,809,115 A | 9/1998 | Inkinen | |
| 5,812,651 A | 9/1998 | Kaplan | |
| 5,813,778 A | 9/1998 | Shi | |
| 5,815,142 A | 9/1998 | Ailard et al. | |
| 5,848,356 A | 12/1998 | Jambhekar et al. | |
| 5,860,074 A | 1/1999 | Rowe et al. | |
| 5,873,108 A | 2/1999 | Goyal et al. | |
| 5,903,852 A | 5/1999 | Schaupp et al. | |
| 5,917,905 A | 6/1999 | Whipple et al. | |
| 5,917,906 A | 6/1999 | Thornton | |
| 5,922,071 A | 7/1999 | Taylor et al. | |
| 5,933,330 A * | 8/1999 | Beutler et al. | 361/814 |
| 5,941,648 A | 8/1999 | Robinson et al. | |
| 5,949,764 A | 9/1999 | Yoshida et al. | |
| 5,958,006 A | 9/1999 | Eggleston et al. | |
| 5,974,334 A | 10/1999 | Jones | |
| D416,256 S | 11/1999 | Griffin et al. | |
| 6,002,944 A | 12/1999 | Beyda | |
| 6,006,109 A | 12/1999 | Shin | |
| 6,009,338 A | 12/1999 | Iwata et al. | |
| 6,016,142 A | 1/2000 | Chang et al. | |
| 6,018,571 A | 1/2000 | Langlois et al. | |
| 6,029,072 A | 2/2000 | Barber | |
| 6,035,214 A | 3/2000 | Henderson | |
| 6,055,439 A | 4/2000 | Helin et al. | |
| 6,058,304 A | 5/2000 | Callaghan et al. | |
| 6,064,734 A | 5/2000 | Hasegawa et al. | |
| 6,084,951 A | 7/2000 | Smith et al. | |
| 6,097,391 A | 8/2000 | Wilcox | |
| 6,101,531 A | 8/2000 | Egglestorl et al. | |
| 6,119,179 A | 9/2000 | Whitridge | |
| 6,133,916 A | 10/2000 | Bukszaar et al. | |
| 6,137,469 A | 10/2000 | Wu et al. | |
| 6,157,630 A | 12/2000 | Adler et al. | |
| 6,166,342 A | 12/2000 | Chou | |
| 6,169,911 B1 | 1/2001 | Wagner et al. | |
| 6,188,917 B1 | 2/2001 | Laureanti | |
| 6,192,118 B1 | 2/2001 | Bayless et al. | |
| 6,198,053 B1 | 3/2001 | Chou | |
| 6,208,879 B1 | 3/2001 | Iwata et al. | |
| 6,215,865 B1 | 4/2001 | McCalmont | |
| 6,233,469 B1 | 5/2001 | Watanabe | |
| 6,243,452 B1 | 6/2001 | O'Shaughnessey et al. | |
| 6,256,631 B1 | 7/2001 | Malcolm | |
| 6,259,449 B1 | 7/2001 | Saxena et al. | |
| 6,262,716 B1 | 7/2001 | Raasch | |
| 6,295,372 B1 | 9/2001 | Hawkins et al. | |
| 6,297,795 B1 | 10/2001 | Kato et al. | |
| 6,297,945 B1 | 10/2001 | Yamamoto | |
| 6,310,609 B1 | 10/2001 | Morgenthaler | |
| 6,317,313 B1 | 11/2001 | Mosgrove et al. | |
| 6,317,781 B1 | 11/2001 | DeBoor et al. | |
| 6,333,973 B1 | 12/2001 | Smith et al. | |
| D454,349 S | 3/2002 | Makidera et al. | |
| 6,370,018 B1 | 4/2002 | Miller et al. | |
| D456,794 S * | 5/2002 | Laverick et al. | |
| 6,389,124 B1 | 5/2002 | Schnarel et al. | |
| 6,405,172 B1 | 6/2002 | Baker et al. | |
| 6,415,138 B2 | 7/2002 | Sirola et al. | |
| 6,442,263 B1 | 8/2002 | Beaton et al. | |
| D462,354 S * | 9/2002 | Kimbre et al. | |
| 6,452,588 B2 | 9/2002 | Griffin et al. | |
| D464,962 S * | 10/2002 | MacGregor et al. | |
| 6,469,910 B2 | 10/2002 | Lefort | |
| 6,483,445 B1 | 11/2002 | England | |
| 6,502,090 B1 | 12/2002 | Raisanen | |
| D468,714 S * | 1/2003 | Maruska et al. | |
| 6,512,507 B1 | 1/2003 | Furihata et al. | |
| D470,842 S * | 2/2003 | Bhatia et al. | |
| 6,516,202 B1 | 2/2003 | Hawkins et al. | |
| D471,559 S * | 3/2003 | De Saulles | |
| 6,535,749 B1 | 3/2003 | Iwata et al. | |
| 6,549,194 B1 | 4/2003 | McIntyre et al. | |
| 6,557,004 B1 | 4/2003 | Ben-Shathar et al. | |
| 6,577,721 B1 | 6/2003 | Vainio | |
| 6,583,806 B2 | 6/2003 | Ludwig et al. | |
| D477,597 S * | 7/2003 | Laverick et al. | |
| 6,636,203 B1 | 10/2003 | Wong et al. | |
| 6,643,124 B1 | 11/2003 | Wilk | |
| 6,661,404 B1 | 12/2003 | Sirola et al. | |
| D488,478 S * | 4/2004 | Laverick et al. | |
| 6,781,575 B1 | 8/2004 | Hawkins et al. | |
| 6,792,090 B1 | 9/2004 | Kobayashi | |
| 6,947,158 B1 | 9/2005 | Kitamura et al. | |
| 6,961,593 B1 | 11/2005 | Lonka et al. | |
| 6,973,217 B2 | 12/2005 | Bolick et al. | |
| 6,976,217 B1 | 12/2005 | Vertaschitsch | |
| 7,007,239 B1 | 2/2006 | Hawkins et al. | |
| 7,058,168 B1 | 6/2006 | Knappe et al. | |
| 7,069,056 B2 | 6/2006 | Iwata et al. | |
| 7,155,419 B2 | 12/2006 | Blackman et al. | |
| 7,231,208 B2 | 6/2007 | Robertson et al. | |
| 2001/0034222 A1 | 10/2001 | Roustaei et al. | |
| 2002/0042853 A1 | 4/2002 | Santoh et al. | |
| 2002/0044136 A1 | 4/2002 | Griffin et al. | |
| 2002/0082043 A1 | 6/2002 | Wilska et al. | |
| 2002/0115478 A1 | 8/2002 | Fujisawa et al. | |
| 2002/0133378 A1 | 9/2002 | Mault et al. | |
| 2002/0154745 A1 | 10/2002 | Shtivelman | |
| 2002/0169924 A1 | 11/2002 | Osborn | |
| 2002/0191160 A1 | 12/2002 | Chuang | |
| 2003/0008679 A1 | 1/2003 | Iwata et al. | |
| 2003/0034987 A1 | 2/2003 | Webb et al. | |
| 2003/0064751 A1 | 4/2003 | Charlier et al. | |
| 2003/0112225 A1 | 6/2003 | Granberg | |
| 2003/0122779 A1 | 7/2003 | Martin et al. | |
| 2003/0228863 A1 | 12/2003 | Vander Veen et al. | |
| 2003/0228888 A1 | 12/2003 | Adamson | |
| 2004/0008827 A1 | 1/2004 | Martin et al. | |
| 2004/0023643 A1 | 2/2004 | Vander Veen et al. | |
| 2004/0026136 A1 | 2/2004 | Hill et al. | |
| 2004/0028192 A1 | 2/2004 | Pelletier | |
| 2004/0028199 A1 | 2/2004 | Carlson | |
| 2004/0039794 A1 | 2/2004 | Biby et al. | |
| 2004/0062367 A1 | 4/2004 | Fellenstein et al. | |
| 2004/0155909 A1 | 8/2004 | Wagner | |
| 2004/0203977 A1 | 10/2004 | Kennedy | |
| 2004/0240163 A1 | 12/2004 | Adams et al. | |
| 2005/0267975 A1 | 12/2005 | Qureshi et al. | |
| 2005/0277451 A1* | 12/2005 | Ku | 455/575.4 |
| 2006/0015819 A1 | 1/2006 | Hawkins et al. | |
| 2006/0019728 A1* | 1/2006 | Sakamoto et al. | 455/575.3 |
| 2006/0033706 A1 | 2/2006 | Haitani et al. | |
| 2006/0121938 A1 | 6/2006 | Hawkins et al. | |
| 2006/0160566 A1 | 7/2006 | Plahte et al. | |
| 2006/0161858 A1 | 7/2006 | Hawkins et al. | |
| 2006/0168539 A1 | 7/2006 | Hawkins et al. | |
| 2007/0105606 A1* | 5/2007 | Yoon et al. | 455/575.4 |
| 2009/0117953 A1* | 5/2009 | Oh | 455/575.1 |

FOREIGN PATENT DOCUMENTS

| | | | |
|---|---|---|---|
| EP | 0704788 | * | 4/1996 |
| EP | 1051012 A2 | * | 11/2000 |
| EP | 1107101 A2 | * | 6/2001 |
| EP | 1220517 A1 | * | 7/2002 |
| FR | 2760933 | * | 9/1998 |
| GB | 2289595 A | * | 11/1995 |
| JP | 2001024762 A | * | 1/2001 |
| WO | WO99/08238 | * | 2/1999 |
| WO | WO01/13605 | * | 2/2001 |

OTHER PUBLICATIONS

"An Introduction to Mobile Messaging," Mobile Messaging, May 2003, [online] [Retrieved on Dec. 10, 2004] Retrieved from the Internet: URL: http://www.lebodic.netlintro.htm.*
"At Last, Technology Harnesse [sic] One of the Most Powerf [sic] Forces know to Men.", GO Corporation, 14 pages, Foster City, (1991).*
"AT&T New Release, NCR Cuts Price of 3170 Notebook Computer 11 to 19 Percent", 2 pages [online], retrieved from the Internet: URL: http://www.att.com/press/0393/930308.nca.html., (Mar. 8, 1993).*
"Definition of Handheld Computer", printed from thte website: http://dictionary.reference.com, Feb. 11, 2004 (3 pgs).*
"Definition of Handheld", printed from thte website: http://searchmobilecomputing.techtarget.com, dated Feb. 11, 2004 (3 pgs).
"Excerpts from Ericsson Mobile Phone 1888 World User's Guide", Copyright 1998 Ericsson Mobile Communications AB.
"Handheld"Game Console—Wikipedia, the free encyclopedia, [online] [Retrieved on Oct. 13, 2006], Retrieved from the Internet: URL: http://en.wikipedia.org/wjkwHandheld_game_console.
"IBM Selects Racotek Data/Voice Communications Services to Interface with Touchmobile Product", PR Newswire, Jan. 26, 1993, 2 pages.
"IBM Touchmobile Information and Planning Guide", International Business Machines Incorporated, Mar. 1993, 20 pages.
"IBM TouchMobile Solution for Data Capture and Communication, Keeping Your Business Moving in the 90's, International Business Machines Incorporated, Jan. 1993, 13 pages."
"IBM's Touchmobile Helps Field Workers Collect Data at the Touch of a Finger", PR Newswire, Jan. 26, 1993, 1 page.
"Nokia, Frequently Asked Questions", http://www.nokia.com.in/nokiaapac/india/faqs_list/0,18778,39_41,00.html.
"PCT Notification of Transmittal of International Preliminary Examination Report", PCT/US2000/22182, (Oct. 26, 2001), 6 pages.
"Printout of various website pages from biz.yahoo.com article "Conference Calling Added to BestNet's Service Designed for Palm OS(R) Handhelds"—Tuesday, Aug. 21, 2001".
"The Handheld Computing Industry—2000", Stanford Technology Ventures Program (STVP), (Jan. 13, 2001), pp. 1-38.
Agrawal, P. et al., "Get Wireless: A Mobile Technology Spectrum", IT PRO, IEEE, (Jul./Aug. 1999), 18-23.
American Programmer, American Programmer, Inc., NY, (Dec. 1991), 4-33.
Caar, R.M. "The Point of the Pen". Byte, Reprinted, Feb. 1991, 10 pages.
Chan, E. et al., "Personal Digital Assistants & Wireless Convergence", MGMT 557 Strategic Management of Innovation, (May 4, 2000), 1-28.
Communications Solutions™ TMC Labs Test Drive, Mar. 2000, Retrieved from the Internet: URL: https://www.tmcnet.com/articles/comsol/0300/0300labs1.htm.
Cowart, T.,Mastering Windows 95—The Windows 95 Bible, (1995), 110-117, 352-359, SyBex, USA.
Cullen, A. "Connecting with Your EO Cellular Module", EO, Inc. Mountain View., (1992, 1993), ii-33.
Cullen, A. "Getting Started with Your EO Personal Communicator", EO, Inc. Mountain View., (1992, 1993), ii-74.
Cullen, A. "Lookup Guide to the EO Personal Communicator", EO, Inc. Mountain View., (1992, 1993), ii-320.
Dyszel, B., "Handspring Visor for Dummies", IDG Books Worldwide, Inc, (2000), o. 13, 15, 121, 122, 123, 208.
Excerpts from Handspring VisorPhone™ User's Guide, Copyright 2000 Handspring, Inc.
Excerpts from Motorola Timeport Tri-Band Mobile Telephone Manual, Copyright 1999 Motorola, Inc.
GO Corporation Information Statement, 218 pages, (Nov. 8, 1993).
Hewlet Packard, Products and Services, http://www.hp.com/, Nov. 11, 2001.
Ikeya, B. "Detailed Overview of the PC Card Standard, PCMCIA", http://www.pcmcia.org/pccarcJstandard.htm., (1998).
Introduction to PCMCIA Technical Tutorial, Dec. 6, 2002. pp. 1-11.
Kanellos, M. "Qualcomm Merges Phone, Handheld", CNET News.com, Sep. 21, 1998 http://www.news.com/Qualcomm+merges+phone%2C+handheld/2100-1001$_{13}$ 3- 215791.html.
MacNeill, D. "Messaging Card and NewtonMail: We Pick Up and Deliver", On The Go Magazine, http://www.pencomputing.com/Newton/NewtonNotes2.html, 2 pages.
MacNeill, D. "Wireless Newton Technology Goes to Work", On The Go Magazine, Oct. 13, 1993, http://www.pencomputing.com/Newton/NewtonNotes2.html, 2 pages.
Maki, K. "The AT&T EO Travel Guide", John Wiley & Sons, Inc., N. Y. 1993, iii-555.
Microsoft Microsoft Windows & MS_DOS User's Guide, (1993), p. 19, 26.
Microsoft® Windows Version 5.1, copyright 2001 (hereinafter "Windows") (screenshots 1-8).
Nokia Introduces Mobile Chat With Nokia 3310, http://www.mobiletechnews.com/info/2000/09/01/1_42022.htm, (Sep. 1, 2000).
PCT International Search Report, Publication WO 01/13605 A3, (Feb. 22, 2001).
PCT International Search Report, PCT/US2000/22182, (Jan. 10, 2001), 8 pages.
pdQ™ Basics Handbook, Qualcomm Incorporated., (1998, 1999), 96 pages.
Plumley, B., "Ten Minute Guide to Windows NT Workstation 4.O", Que, (Aug. 1996).
Powell, E. "Kyocera pdQ Smartphone—Brief Article—Product Announcement", http://www.findarticles.com/plartjdes/mjmOFAUTis917/ai65650619/print., (2000).
Printout of various website pages from www.bestnetcall.com regarding pdaCall (patent pending), printed Aug. 21, 2001.
Qualcomm pdQ™ 1900 Digital PCTS SmartPhone, Qualcomm Incorporated, (1999), 2 pages.
Schlender, B. R., "Hot New PCs That Read Your Writing", Fortune, Reprinted, (Feb. 11, 1991), 6 pages.
Shah, R. "The Qualcomm pdQ: Kill Two Birds with One Phone", CNN.com, http://archives.cnn.com/i999rrECHJptechJi2/o3/qualcomm.pdq, (Dec. 3, 1999).
Stock, R. "The World of Messaging An Introduction to Personal Communications", EO, Inc., Mountain View, (1992, 1993), p. ii-69.
Supplemental European Search Report dated Apr. 24, 2007 in PCT/US02/26197, European Patent Office, 3 pages.
T-Mobile Products; Handhelds, http://www.tmobile.com, (Sep. 28, 2002), 2 pages.
T-Mobile Products; Sidekick, http://www.tmobile.com, (Sep. 28, 2002), 3 pages.
Toshiba Computer Systems Group, http://www.toshiba.com (May 28, 2002), 1 page.
Toshiba Computer Systems Group: Pocket PC e570 http://www.pda.toshiba.com (Jul. 7, 2001), 2 page.

* cited by examiner

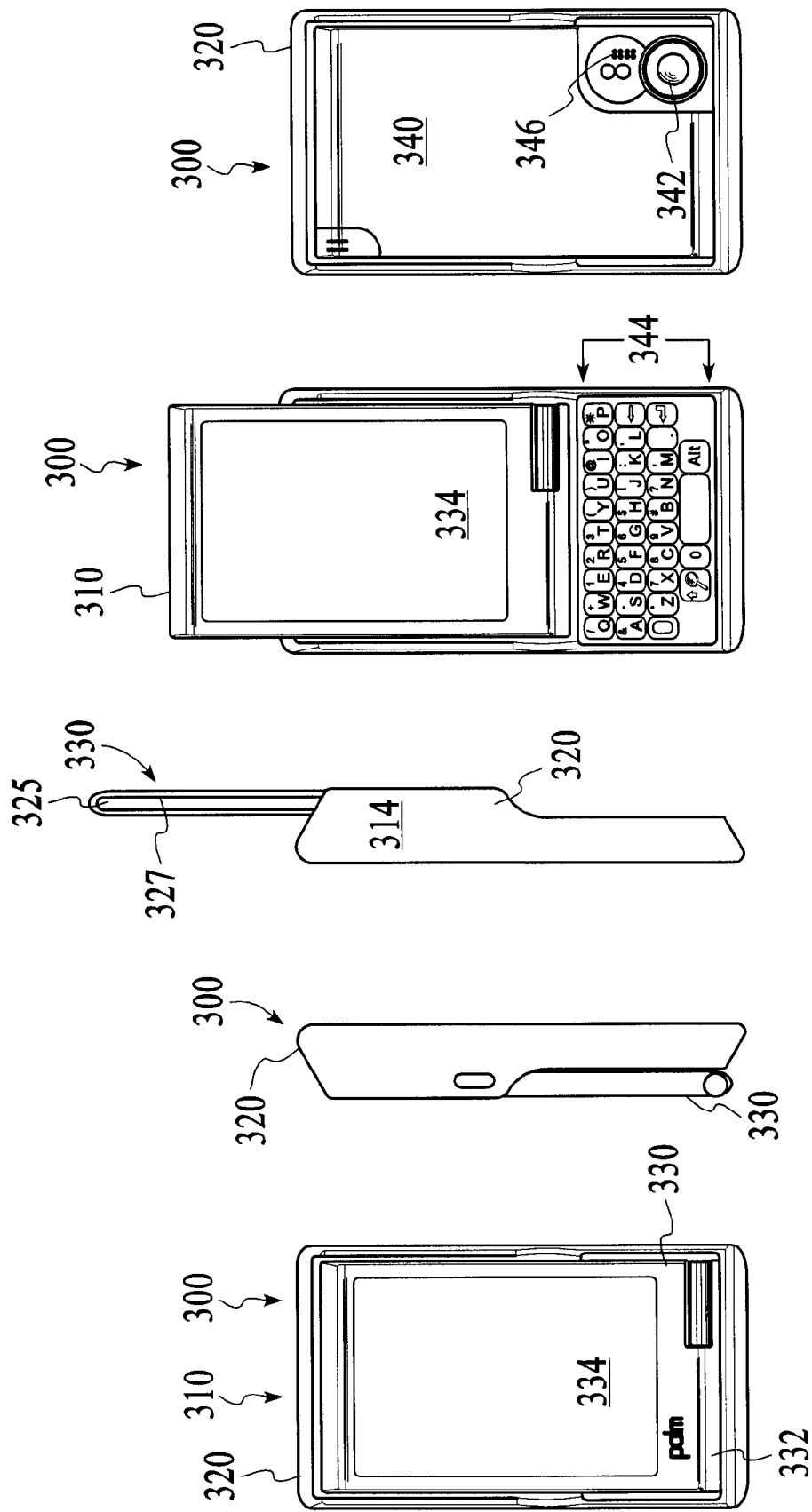

HOUSING FOR MOBILE COMPUTING DEVICE HAVING CONSTRUCTION TO SLIDE AND PIVOT INTO MULTIPLE POSITIONS

TECHNICAL FIELD

The disclosed embodiments relate generally to the field of mobile computing devices. In particular, the disclosed embodiments pertain to a construction of a housing for a mobile computing device.

BACKGROUND

Over the last several years, the growth of cell phones and messaging devices has increased the need for keypads and button/key sets that are small and tightly spaced. In particular, small form-factor keyboards, including QWERTY layouts, have become smaller and more tightly spaced. With decreasing overall size, there has been greater focus on efforts to provide functionality and input mechanisms more effectively on the housings.

In addition to a keyboard, mobile computing devices and other electronic devices typically incorporate numerous buttons to perform specific functions. These buttons may be dedicated to launching applications, short cuts, or special tasks such as answering or dropping phone calls. The configuration, orientation and positioning of such buttons is often a matter of concern, particularly when devices are smaller.

At the same time, there has been added focus to how displays are presented, particularly with the increase resolution and power made available under improved technology. Moreover, form factor consideration such as slimness and appearance are important in marketing a device.

BRIEF DESCRIPTION OF THE DRAWINGS

FIG. 3A thru FIG. 3E illustrate a mobile computing device configured under an embodiment.

DETAILED DESCRIPTION

Figure 1:
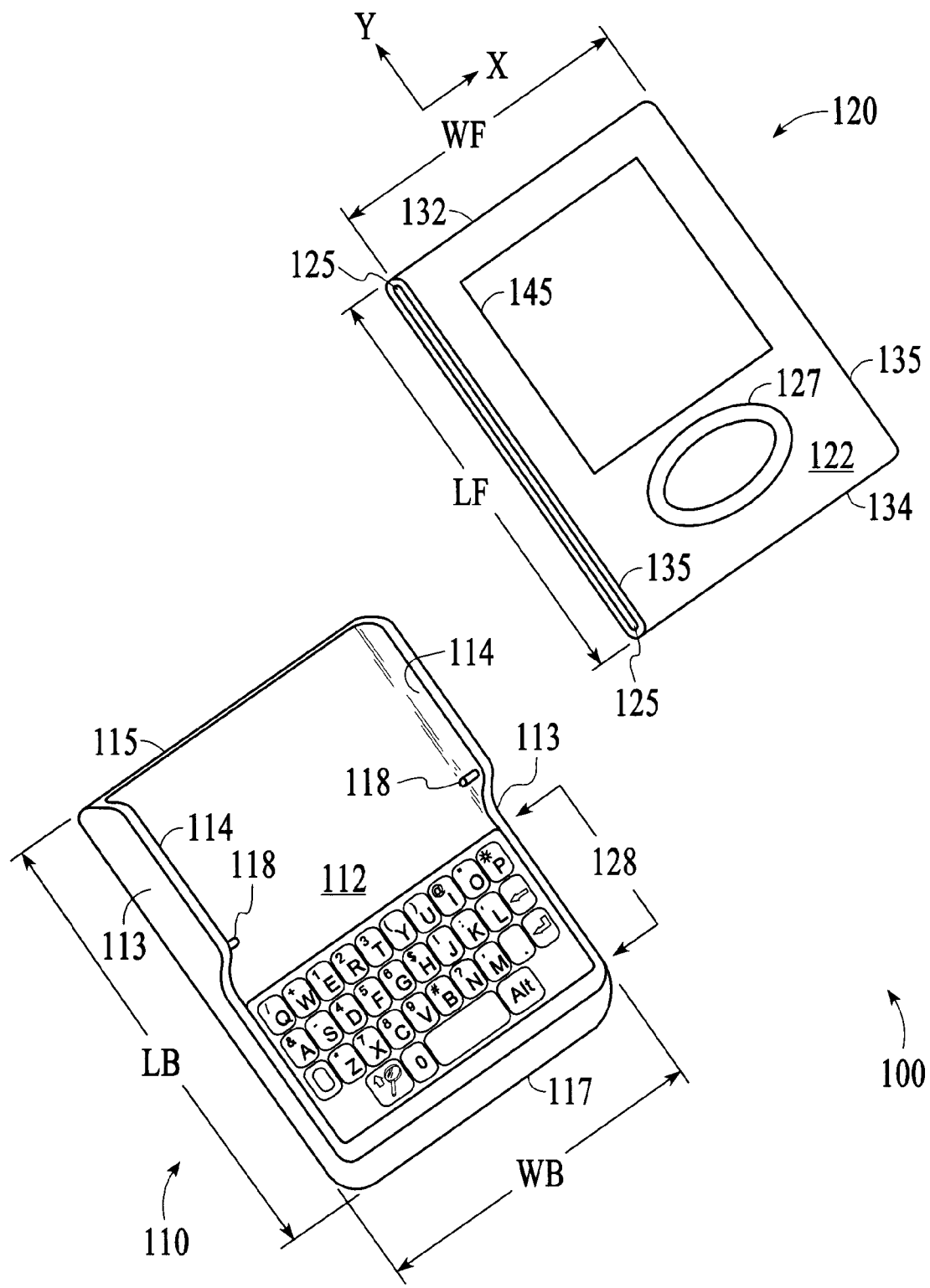
FIG. 1 is an exploded, front isometric view of a housing for a mobile computing device, according to an embodiment of the invention.

Embodiments described herein provide for a mobile computing device, or housing thereof, having a construction to both slide and pivot. The ability of the housing to slide and pivot enables the housing or device to have multiple positions of use. Among the positions, a device may be used in both a contracted and extend position, with the extended position being used to provide additional interfaces or functionality to the user. Additionally, an embodiment provides that the device may include at least one segment that can flip (i.e. pivot 180 degrees or more) to provide additional functionality or interfaces, as well as enable some interfaces or functionality to be encapsulated and protected. Numerous positions and states of use are possible with embodiments and variations such as described herein.

In an embodiment, a mobile computing device includes a housing having separate housing segments that each contain or provide electrical hardware and resources. The housing segments may be well defined. For example, each housing segment may have its own shell, and be connected to the other housing segment through use of a connector. As described herein, the separate housing segments may slide and flip into positions such as described with one or more embodiments.

In an embodiment, a housing for a mobile computing device includes a base segment and a frontal segment. The segments may couple to both slide and pivot from select positions. A result achieved is that the device, or its housing, can be manipulated into one or more extended positions of use, and into two contracted positions. At least one of the two contracted positions may be a position of device usage.

Furthermore, according to an embodiment, one of two contracted positions may be used to protect or make inaccessible a component, such as a display surface. Additionally, an extended position may be used to expose another component, such as a keyboard, on the base segment.

In an embodiment, a housing is provided for a computing device. The housing may include a base segment and a frontal segment. The base segment and the frontal segment may be coupled to enable the frontal segment to slide between an extended and contracted position. Additionally, the base segment and the frontal segment may be pivotally engaged to enable the frontal segment to pivot 180 degrees (or thereabouts) when in the extended position, and then to slide from the pivoted position into the contracted position.

According to one embodiment, a housing is provided for a mobile computing device. The housing includes a base segment and a frontal segment. The base segment and frontal segment may be coupled or connected as to be to move and separate between an extended position and a contracted position without pivoting. The contracted position may correspond to a minimum overall length of the housing, and the extended position may correspond to a maximum overall length. Two housing segments may also be pivotally coupled so that the frontal segment is movable, while remaining connected at a given position to the base segment, from a first relative position to a second relative position and from the second relative position to the first relative position.

Another embodiment includes a housing for a mobile computing device. The housing includes a base segment and a frontal segment. The base segment includes a base face. A frontal segment includes a first face and a second face, with the first face being directed in an opposite direction from the second face. The frontal segment and the base segment may be coupled to enable (i) a first contracted position in which the first face and the base face are both oriented in a first direction, the second face is oriented towards the base face, and a length of the housing is minimized; (ii) a first extended position in which the first face and the base face are both oriented in the first direction, the second face is oriented towards the base face, and the length of the housing is maximized; (iii) a second extended position in which the second face and the base face are both oriented in the first direction, and the first face is oriented towards the base face; and (iv) a second contracted position in the second face and the base face are both oriented in the first direction, the first face is oriented towards the base face, and the length of the housing is minimized.

As used herein, relational terms such as "about" and "substantially" mean at least 90% of a stated quantity or measurement.

A mobile computing device includes a portable device typically carried and used primarily with one hand. Examples of mobile computing devices for use with embodiments described herein include cellular telephony and messaging devices, sometimes referred to as "smart phones" or portable multi-functional devices capable of various functions such as media playback.

Device Housing

FIG. 1 is an exploded, front isometric view of a housing for a mobile computing device, according to an embodiment of the invention. In an embodiment, the housing 100 includes a base segment 110 and a frontal segment 120. The base segment 110 includes a base face 112, and a pair of sidewalls 114 extending outward from the base face. A top edge 115 and a bottom edge 117 may define an overall length LB of base segment 110. Lateral edges 113, 113 of the base segment 110 (which may coincide with the sidewalls 114) may define a width WB of the base segment 110. In one embodiment, engagement members 118, 118 extend from each of the sidewalls 114, 114.

The frontal segment 120 has a first face 122 (outward in FIG. 1) and a second face (not visible in FIG. 1). The second face (see element 22 of FIG. 2 series) may oppose or face in an opposite direction from the first face. For the frontal segment 120, top edge 132 and bottom edge 134 of the frontal segment 120 may define a length LF. Lateral edges 135, 135 may define a width WF of the frontal segment 120. Each lateral edge 135 may include a receiving track 125 that extends some portion of the length LF of the frontal segment 120.

In an embodiment, the width WF of frontal segment 120 is less than the width WB of the base segment 110. As such, an embodiment provides that some perimeter cross-section in the form of a widthwise sectional strip on the frontal segment 120 is always contained within the width WB of the base segment 110, as the two housing segments are manipulated.

Under one embodiment, each of the engagement members 118, 118 extending from the sidewalls 114, 114 of the base segment 110 engage one of the tracks 125 of the frontal segment 120. While FIG. 1 shows only one track 125, symmetry may apply, and the description of one side of the housing may be equally applicable to the other side. The engagement members 118 may slide within the tracks 125, so as to enable the frontal segment 120 to move linearly along an axis Y between an extended position and a contracted position.

The tracks 125 combine with the engagement members 118 to enable a pivot motion when the frontal and base segments are manipulated into a particular position, which coincides with an extended position or position of maximum length. As described with one or more other embodiments, the pivot motion that is enabled provides for the frontal segment 120 to pivot 180 degrees, so as to enable the first face 122 to be hidden (rather than exposed as shown) and expose the second face (which is hidden in FIG. 1). Additionally, as described with one or more embodiments, the frontal segment 120 is able to slide between the extended and contracted position before or after the frontal segment 120 is pivoted. This enables the first face 122 of the frontal segment 120 to be hidden or protected by orienting the first face towards the base face 112 while manipulating the housing to have the contracted position. As further described, functionality or features of the computing device may be exposed as a result of moving the frontal segment 120 and base segment 110 apart, into the extended position.

The housing 100 may provide for several features of a fully functional mobile computing device. In one embodiment, the frontal segment 120 provides for a display surface that may be provided by including a display component or assembly within the frontal segment. The display surface may be provided by the formation of an opening 145 that enables the display surface to be exposed. As an alternative to an opening, the frontal segment 120 may include a translucent window or section that is positioned to overlay a display surface of a display assembly.

In an embodiment, the frontal segment 120 may provide additional features, such as buttons or a button set on the first surface 122. In one embodiment, the additional features are provided for by way of openings 127, that are positioned to contain and provide individual buttons. Alternatively, some buttons, features or mechanical interfaces may be integrally formed with one or both housing segments.

With regard to the base segment 110, the base face 112 may include or provide for a keypad region 128, where a keypad interface may be provided. Other input features or mechanisms may also or alternatively be included on the base face 112. As will be described, a region of the base face 112 on which the keypad is to be provided may be selectively exposed by a user who manipulates the frontal segment 120 into the extended position.

According to one or more embodiments, the housing 100 may be manipulated through a combination of linear motion and pivot to have multiple positions or states of use (or non-use). FIG. 2A-2E illustrate the various states of use/non-use that may be provided through positioning base and frontal segments of housing 100, in accordance with one or more embodiments.

With reference to FIG. 1 and FIG. 2A-FIG. 2E, one or more embodiments provide that a perimeter of the frontal segment 120 is contained within the sidewalls 114 or width of the base segment 112. As such, one or more embodiments provide that the various positions, motions and states of use described with FIG. 2A-FIG. 2E are achieved while maintaining at least a widthwise strip of the frontal segment 120 within the confines of sidewalls 114. Additionally, FIG. 2A-FIG. 2E illustrate one side view perspective of the frontal segment 120 and the base segment 110 being manipulated. Symmetry may apply, so that the description provided for the particular side view in FIG. 2A-2E may be equally applicable to the other side view.

Figure 2A:
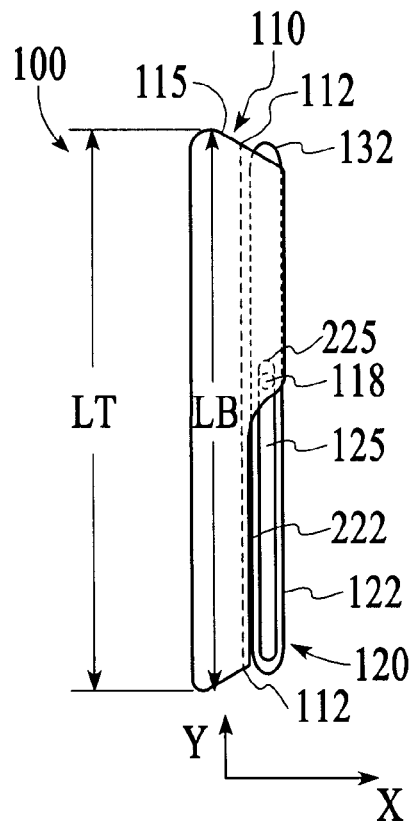
FIG. 2A-2E illustrate a device housing manipulated in accordance with an embodiment of the invention.

In FIG. 2A, the housing 100 is shown to be in a first contacted position. In this position, the frontal segment 120 is moved downward to its full extent, so that the top edge 132 of the frontal segment is at its lowest position with reference to the top edge 115 of the base segment 110. As shown by FIG. 2A, the engagement members 118 are inserted and engaged within the track 125 of the frontal housing segment 120. In the contracted position shown, the engagement members 118 have no freedom of movement to permit frontal segment 120 to move in any direction other than an upward motion, towards an extended position shown with FIG. 2A. The track 125 may include a first termination 225 that precludes motion of the frontal segment 120 in any direction but upward. The termination 225 also precludes the engagement member 118 from separating from the track 125.

In the contracted position of FIG. 2A, an embodiment provides that an overall length LT of the housing is minimized. This length may correspond to be the larger of the length LB of the base segment 110 or length LF (which is shown in FIG. 1) of the frontal segment 120. With specific reference to the implementation shown, the overall length LT equals the length LB of the base segment 110.

FIG. 2A also illustrates the position of the first face 122 of the frontal segment 120 being directed in a common direction (axis X) with respect to the base face 112. A second face 222 of the frontal segment is directed towards the base face 112. In the case where housing 100 is incorporated with a fully-functioning mobile computing device, the first face 122 may provide a component such as a display screen. Thus, a state or position shown by FIG. 2A corresponds to one where the display is visible to the user, and the device's overall length is minimized.

Figure 2B:
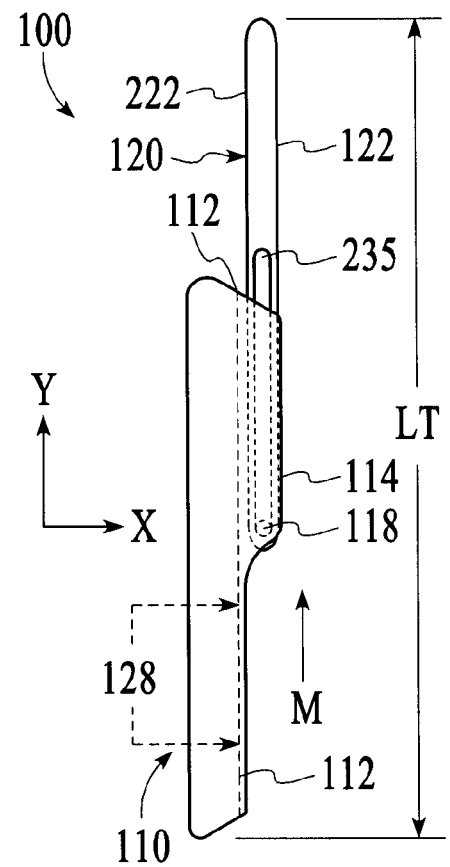

FIG. 2B illustrates the housing 100 moved into a first extended position, under an embodiment. In the first extended position, the frontal segment 120 is raised and upright, and the overall length LT of the device is maximized. Under one implementation, the overall length LT may include a sum of the total length of one of the two segments and a partial length of the other of the two housing segments. In order to manipulate the housing into the first extended position, the frontal segment 120 is moved linearly (i.e. slid) upward, as provided by the directional arrow M. In an embodiment shown, the upward direction may further be referenced by the directional axis Y. The linear motion of the frontal segment 120 may be provided by the track 125 of the frontal segment sliding past the engagement members 118, which accommodate the travel. As the maximum position, the track 125 may have a second termination 235, precluding engagement member 118 from separating from the track.

In the first extended position, the first surface 122 of the frontal segment 120 and the base face 112 are still aligned and oriented outward along the directional arrow X. As such, a component such as a display surface is accessible and usable to a user. Additionally, a region on the base face 112 is exposed. As described with an embodiment of FIG. 1, the exposed region may correspond to a keypad region 128, where a keyboard or other similar interface may be provided.

Figure 2C:
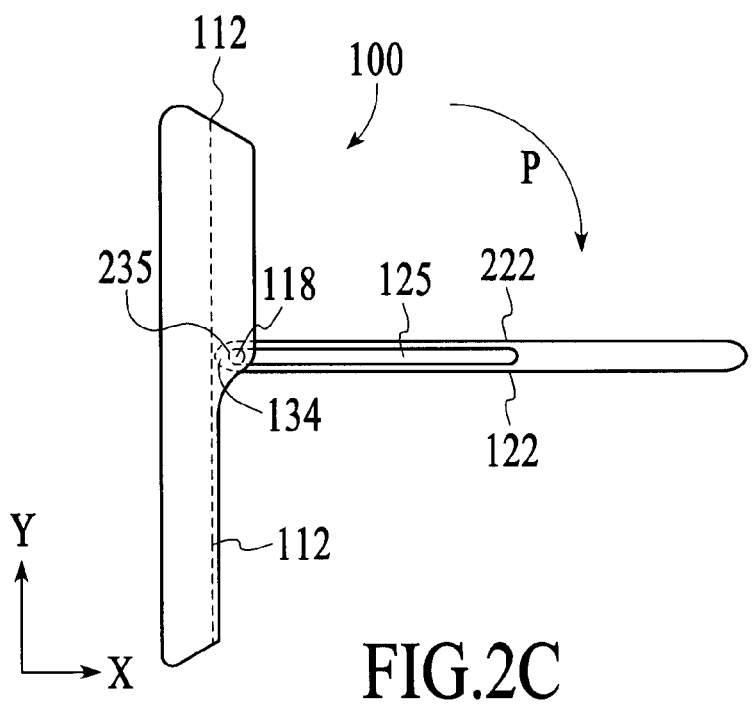
Figure 2D:
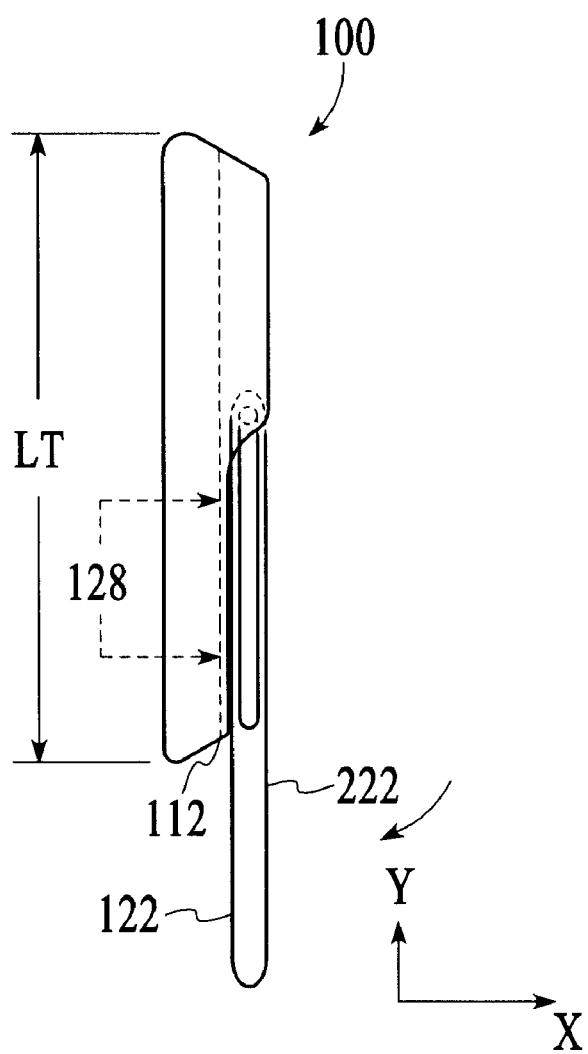

FIG. 2C illustrates an intermediate position of the frontal segment 120 pivoting between the first extended position and a second extended position (see FIG. 2D). Under one embodiment, the pivot motion (shown by P) may occur when the engagement member 118 abuts the second termination 235 (i.e. when the housing is in the first extended position). In this position, there is sufficient space for the bottom edge 134 of the frontal segment 120 to pivot without obstruction from the base face 112.

In order to enable the pivot at this position, an embodiment provides that the track 125 of the frontal segment 120 must extend sufficiently towards the bottom edge 134, so that the distance between the engagement member 118 at the second termination 235 is less than the distance between the engagement member 118 and the base face 112. With such clearance, the pivot motion P may be enabled.

FIG. 2D illustrates the housing 100 being manipulated into a second extended position for the base segment 110 and the frontal segment 120, under an embodiment. In this position, the frontal segment 120 is downward and extended. The angle of the pivot between the first and second extended position may correspond to about 180 degrees. In the second extended position, the front face 122 of the frontal segment 120 is facing the base face 112. The second face 222 is directed outward with the base face 112, along the axis X. In the second extended position, the frontal segment 120 may only be capable of linear motion that is upward, in the direction of axis Y. The frontal segment 120 may overlay and occlude the previously exposed region 128 of base face. Additionally, the overall length LT of the housing 100 may correspond to a sum of the total length LB of the base segment 110, and a portion of the overall length of the frontal segment 120.

The length LT of the second extended position may coincide with the maximum length of the device. The length LT of the device in the second extended position may be the same as that of the first extended position. Alternatively, one of the extended positions may be associated with a length that is greater than the length of the other extended position.

Figure 2E:
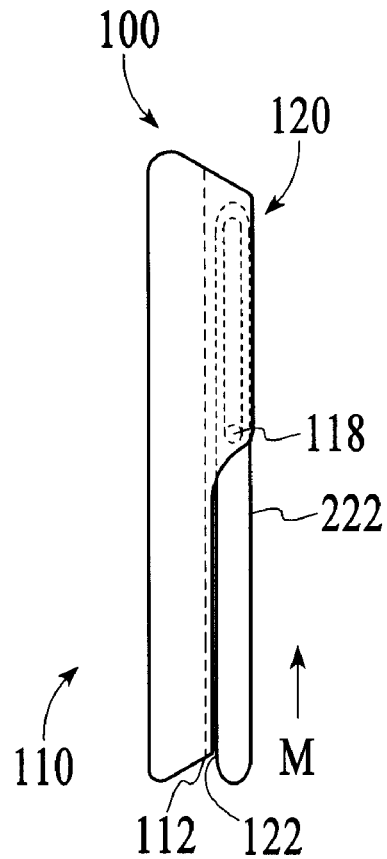

FIG. 2E illustrates the housing 100 being manipulated into a second contracted position for the base segment 110 and the frontal segment 120, under an embodiment. The second contracted position may be achieved by moving, through linear motion, the frontal segment 120 upward along the axis Y, as shown by motion M. The second contracted position may be similar to the first contracted position shown by an embodiment of FIG. 2A, except that the first face 122 of the frontal segment is directed inwards towards the base face 112. The second face 222 of the frontal segment 120 may be aligned outward, in the direction of the base face 112. This position enables a component (e.g. touch screen or display) on the front face 122 to be protected, or positioned from inadvertent contact. Likewise, the region 128 of the base face 112 may be occluded, where other interfaces or components may be provided. As such, the second contracted position may correspond to a position desired by a user who wishes to not use the device, and/or power the device down.

With reference to embodiments shown in FIG. 2A thru FIG. 2E, housing 100 (or a device having such housing) may be manipulated by (i) from the first contracted position, sliding the frontal segment 120 apart from the base segment the maximum length permitted by the track 125, thus achieving the first extended position; (ii) from the first extended position, flipping or pivoting the frontal segment 120 from an upright position downward, so as to achieve the second extended state; (iii) from the second extended state, sliding the frontal segment 120 upward into a contracted state.

In the case of a mobile computing device, for example, the first contracted position may be used for a first type of use (telephony, watching video). The first extended position may enable the user to use a keypad or other feature provided on the base segment 110. This feature may be inaccessible when the device is in a contracted position. The user may then manipulate the device into the second extended position and then the second contracted position to turn the device off, for example, or otherwise place the device in a state of non-use. As an alternative or variation, the second contracted position may provide use of other features or functions, such as a camera or microphone.

From the second contracted position of FIG. 2E, the housing 100 may be manipulated in the reverse order shown to enable the device to move into an operable or useful position. For example, from the state of non-use, the device containing the housing may be manipulated into the first contracted position as follows: (i) slide the frontal segment 120 downward from the second contracted state, to the full extent permitted by the track 125, so as to achieve the second extended position; (ii) pivot or rotate the frontal segment from the downward position to the upright position of the first extended position; and (iii) slide the frontal segment 120 downward from the first extended position to the full extend permitted by track 125, so as to achieve the first contracted position.

While an embodiment such as illustrated in FIG. 2A-FIG. 2E provide that the frontal segment and the base segment are pivotable by an angle of about 180 degrees, embodiments recognize that certain embodiments may utilize maximum pivot angles that are less than 180 degrees. In one embodiment, the maximum pivot angle between the frontal segment and the base segment ranges between 30 and 60 degrees, while in other embodiments it may range between 90 and 180 degrees.

While embodiments of FIG. 2A-FIG. 2E are described with reference to a housing for a mobile computing device, the descriptions provided may apply to functional computing device that includes the housing described.

Device Implementations

As described elsewhere, embodiments described herein may be implemented in the form of a mobile computing device, having a housing with features such as described herein. An example of a mobile computing device for use with embodiments described herein includes a cellular or wireless (e.g. WiFi enabled) telephony/messaging device. Such devices are typically small, but seek to optimize display size and use of user-interface mechanisms, such as keyboards. These types of mobile computing devices have many functions, including use for messaging or voice communications.

FIG. 3A thru FIG. 3E illustrate a mobile computing device configured under an embodiment. In an embodiment, a mobile computing device 300 includes a housing construction such as shown and described with an embodiment of FIG. 2A-FIG. 2E. Each of FIG. 3A (frontal view), and FIG. 3B (side view) show a mobile computing device 300 in the first contracted position, such as shown and described with FIG. 2A. The mobile computing device 300 includes a housing 310 including a base segment 320 and a frontal segment 330. A display surface 334 is provided on a first face 332 of the frontal segment 330. In the first contracted position shown by FIG. 3A and FIG. 3B, the length of the mobile computing device 300 is minimized.

FIG. 3C is a side view of the first extended position for mobile computing device 300. The first extended position may be achieved by sliding the frontal segment 330 upwards. A track 325 on each lateral side 327 of the mobile computing device 300 may engage members (not shown) of the base segment 320, as described with an embodiment of FIG. 2A thru FIG. 2E. The track 325 may slide about a member (not shown in FIG. 3C) extending from sidewalls 314 of the base segment 320, which in an embodiment shown, contains the frontal segment 330.

FIG. 3D is a frontal view of the first extended position. As shown, the first extended position enables the user with full access to both keyboard 344 and display surface 334. Such access and positioning of the two features promotes messaging and text entry with the mobile computing device. The keyboard 344 may be of a QWERTY formation, for example. As a result of enabling the housing 310 to extend and contract, the space provided for the keyboard 344 may be optimized, at least for the overall size of the device 300. As such, larger area may be provided to individual keys that comprise the keypad 344. Numerous other features may be included with or in place of the keyboard 344.

With reference to FIG. 3E, the second contracted position is shown for the mobile computing device 300, under an embodiment of the invention. In this position, a back face 340 of the mobile computing device 300 includes features, such as a camera lens 342 and microphone 346. The back face 340 may combine with the base segment 320 to protect the display surface 334 (FIG. 3D), as well as the keypad 344 (FIG. 3D). Both components may also be protected against inadvertent use, which is not uncommon for mobile computing devices.

Hardware Diagram

Figure 4:
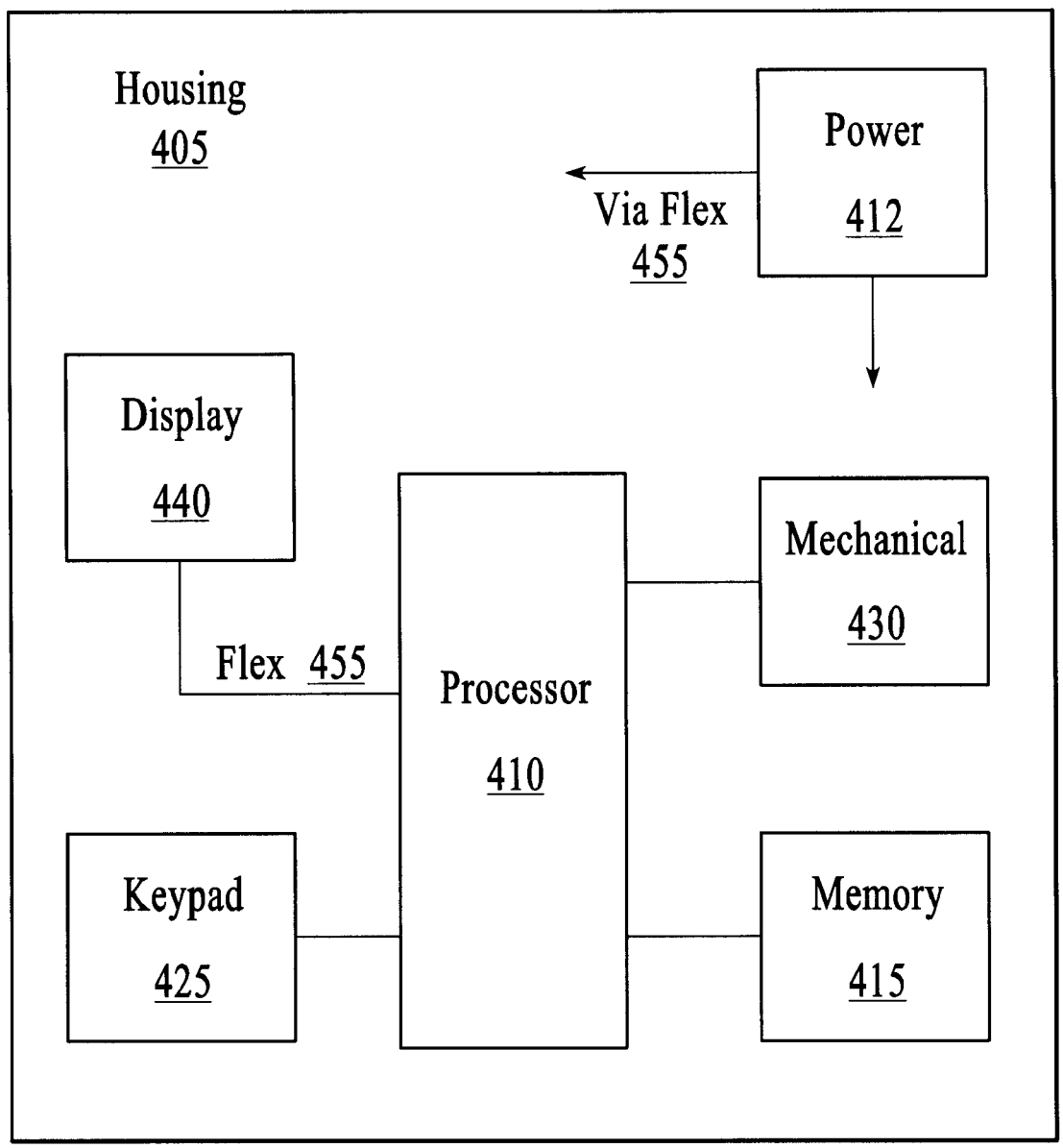
FIG. 4 is a simplified hardware diagram for use with one or more embodiments of the invention.

FIG. 4 is a simplified hardware diagram for use with one or more embodiments of the invention. A housing 405 for a mobile computing device (as shown with, for example, FIG. 1) may include various components, including a processor 410, power 412, and memory resources 415. The processor 410 is may be coupled to a display component 440, a keypad 425, and one or more other mechanical interface features 430. According to one variation, the display component 440 may be contact sensitive. Alternatively, the display component 440 may be optical and light-sensitive (to simulate contact-sensitivity). The keypad 425 may be a keyboard, a number pad, or a combination thereof (e.g. keypad with dial pad provided). As a keyboard, a QWERTY layout may be provided. Some examples of mechanical interface features 430 include navigation button sets, application button sets, and call action button sets. Processor 410 is configured to recognize input from actuation of any of the mechanical interface features 430, and to execute logic associated with the feature.

According to an embodiment, the housing 405 may include separate segments that are coupled in a manner described with other embodiments. As such, the various components described herein may be provided in with separate housing segments. For example, as provided with an embodiment of FIG. 3A-FIG. 3E, the display component 440 may be provided on the frontal housing segment 320 (FIG. 3A) and the keypad 425 may be provided base segment 320.

One or more embodiments provide that power and data communications are extended between the segments that comprise the housing 405. In the case where housing 405 is implemented with device 300 (see housing 310), one embodiment provides for the use of a flex cable 455 to carry data and power from one housing segment to another. Generally, flex cables offer the advantage of being able extend and retract, while being used with structures that maintain the cable in place. In one implementation, base segment 320 (FIG. 3C) may maintain power resource 412, processor 410 and memory 415, all of which are needed to operate the display 440 on the frontal segment 330 (FIG. 3C.). For example, the flex cable 455 may extend from the base face into a top ledge or edge of the frontal segment 330. The flex cable may extend and retract to accommodate and maintain connectivity in the various positions of the frontal segment 330 with regard to the base segment 320.

As an alternative or addition to use of the flex cable 455, one or more embodiments provide that each housing segment of housing 405 includes on-board power that can be charged through a common or separate bus bar. Additionally, the two housing segments may communicate data wirelessly, using, for example, wireless USB or a proprietary protocol.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

The invention claimed is:

1. A housing for a mobile computing device, the housing comprising:
   a base segment comprising a pair of engagement members, the pair of engagement members being substantially positioned at a midpoint along a length of the base segment; and
   a frontal segment that is (i) linearly coupled to the base segment to move between an extended position and a contracted position without pivoting, the contracted position corresponding to a minimum overall length of the housing and the extended position corresponding to a maximum overall length of the housing, and (ii) pivotally coupled to the base segment, via the pair of engagement members of the base segment, to pivot, while remaining connected at a given position, from a first relative position to a second relative position and from the second relative position to the first relative position, such that a top surface of the frontal segment can move in an arc that is about 180 degrees in moving from the first position to the second position.

2. The housing of claim 1, wherein the frontal segment is linearly coupled to the base segment to be capable of moving between the extended position and the contracted position when the frontal segment is in the first relative position and when the frontal segment is in the second relative position.

3. The housing of claim 2, wherein the frontal segment provides housing for one or more components that are accessible to a user when the frontal segment is in the first relative position, and wherein the one or more components are inaccessible to the user when the frontal segment is in the second relative position.

4. The housing of claim 1, wherein the given position corresponds to the extended position.

5. The housing of claim 1, wherein the frontal segment includes a first lateral surface and a second lateral surface, each of the first and second lateral surfaces extending from a top surface to a bottom surface of the frontal segment, and wherein each of the first and second lateral surfaces includes a corresponding track; and
  wherein each engagement member of the pair of engagement members is retained within the corresponding tracks of one of the first or second lateral surfaces.

6. The housing of claim 5, wherein the frontal segment is structured to provide a display surface, and the base segment is structured to position a keyboard on a region of the base face, wherein the region is occluded when the base segment and frontal segment are in the contracted position.

7. A housing for a mobile computing device, the housing comprising:
  a base segment having a base face and a pair of engagement members, the pair of engagement members being substantially positioned at a midpoint along a length of the base segment; and
  a frontal segment having a first face and a second face, the first face being directed in an opposite direction from the second face;
  wherein the base segment and the frontal segment are linearly coupled to enable the base segment and the frontal segment to be moved between an extended position and a contracted position, and wherein when the frontal segment and the base segment are in the extended position, the frontal segment is enabled to pivot, via the pair of engagement members, between (i) an upright position in which the first face and the base face are oriented outward in a first direction, and (ii) a downward position in which the first face is oriented towards the base face and the second face is oriented in the first direction.

8. The housing of claim 7, wherein the base segment includes a pair of sidewalls that retain a perimeter section of the frontal segment as the frontal segment moves linearly between the extended position and the contracted position, and pivotally between the upright position and the downward position.

9. The housing of claim 7, wherein when the frontal segment is in the extended and upright positions, a portion of the base face is exposed, and wherein when the frontal segment is in the contracted position, the portion of the base face is inaccessible to a user.

10. A housing for a mobile computing device, the housing comprising:
  a base segment having a base face;
  a frontal segment having a first face and a second face, the first face being directed in an opposite direction from the second face and including a display;
  wherein the frontal segment and the base segment are coupled to enable (i) a first contracted position in which the first face and the base face are both oriented in a first direction, the second face is oriented towards the base face, and a length of the housing is minimized; (ii) a first extended position in which the first face and the base face are both oriented in the first direction, the second face is oriented towards the base face, and the length of the housing is maximized; (iii) a second extended position in which the second face and the base face are both oriented in the first direction, and the first face is oriented towards the base face; and (iv) a second contracted position in the second face and the base face are both oriented in the first direction, the first face is oriented towards the base face, and the length of the housing is minimized.

11. The housing of claim 10, wherein the base segment and the frontal segment are linearly moveable between the first contracted position and the first extended position, and between the second extended position and the second contracted position.

12. The housing of claim 10, wherein the base segment and frontal segment are coupled to enable the frontal segment to pivot from the first extended position to the second extended position.

13. The housing of claim 10, wherein the base segment includes a pair of sidewalls that extend from the base face, wherein the pair of sidewalls retain a perimeter of the frontal segment.

14. A mobile computing device comprising:
  a housing comprising a base segment having a base face;
  a frontal segment having a first face and a second face, the first face being directed in an opposite direction from the second face;
  wherein the frontal segment and the base segment are coupled to enable (i) a first contracted position in which the first face and the base face are both oriented in a first direction, the second face is oriented towards the base face, and a length of the housing is minimized; (ii) a first extended position in which the first face and the base face are both oriented in the first direction, the second face is oriented towards the base face, and the length of the housing is maximized; (iii) a second extended position in which the second face and the base face are both oriented in the first direction, and the first face is oriented towards the base face; and (iv) a second contracted position in the second face and the base face are both oriented in the first direction, the first face is oriented towards the base face, and the length of the housing is minimized;
  one or more internal components, including a processor, provided in at least one of the base segment or the frontal segment;
  a display surface provided on the first face of the frontal segment, so as to be exposed when the frontal segment is in the first contracted position and in the first extended position, and inaccessible when the frontal segment is in the second contracted position.

15. The mobile computing device of claim 14, further comprising one or more input features provided on the base face, the one or more input features being exposed when the frontal segment is in the first extended position.

16. The mobile computing device of claim 14, further comprising a keyboard interface provided on the base face, the keyboard interface being exposed when the frontal segment is in the first extended position.

17. The mobile computing device of claim 14, wherein the base segment and the frontal segment of the housing are linearly moveable between the first contracted position and the first extended position, and between the second extended position and the second contracted position.

18. The mobile computing device of claim 14, wherein the base segment and frontal segment of the housing are coupled to enable the frontal segment to pivot from the first extended position to the second extended position.

\* \* \* \* \*